Patented Dec. 23, 1924.

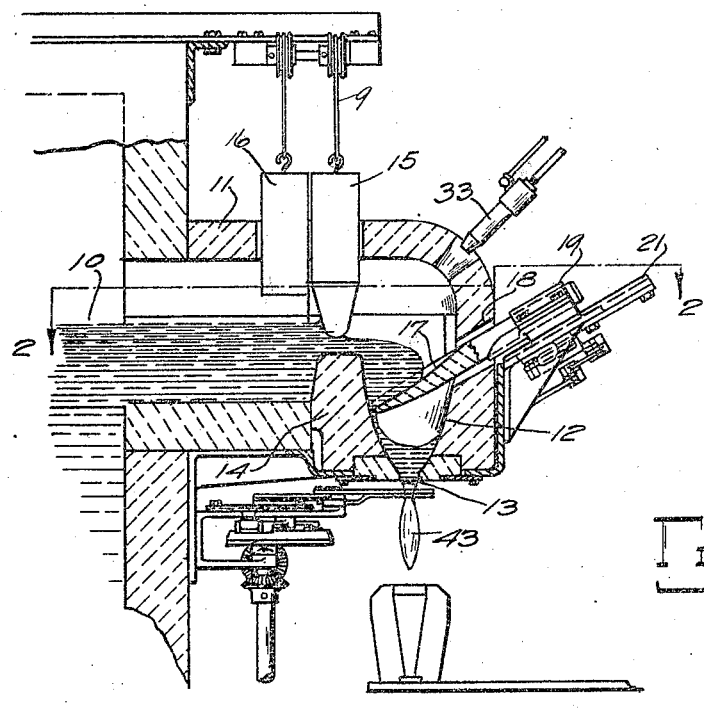
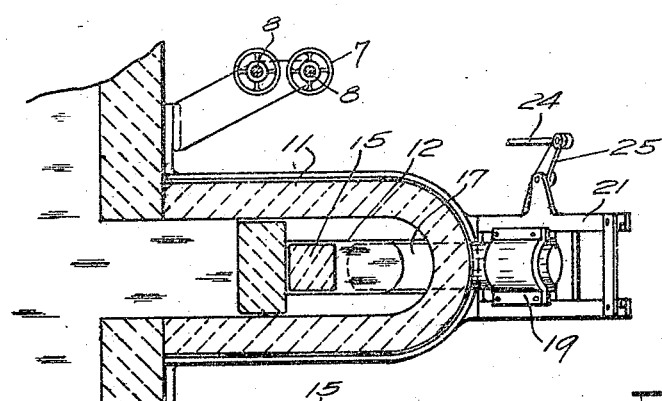
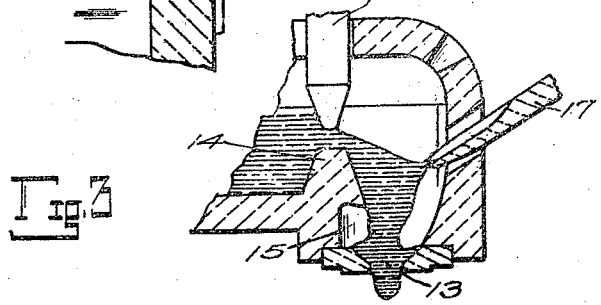

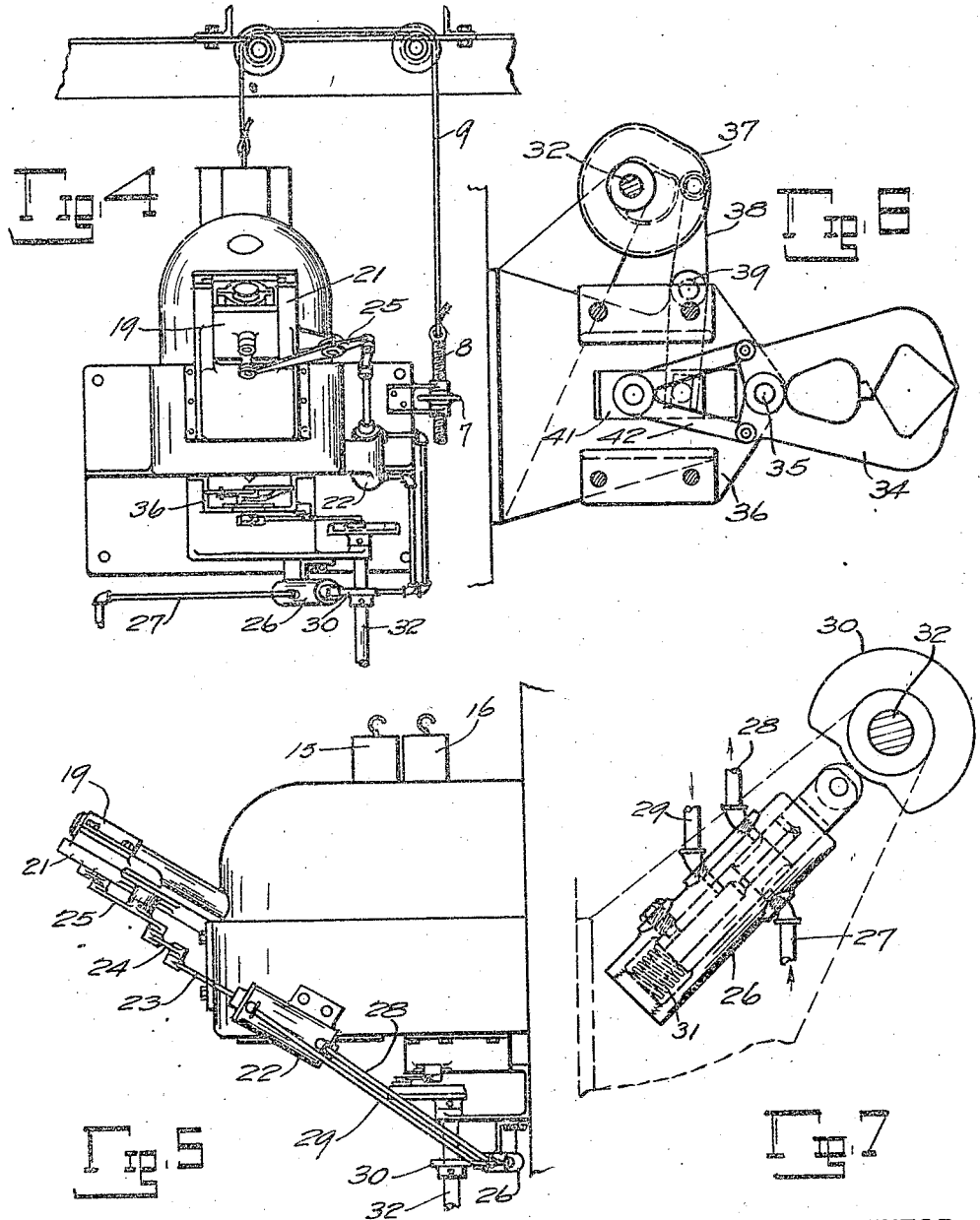

1,520,229

UNITED STATES PATENT OFFICE.

ENOCH T. FERNGREN, OF TOLEDO, OHIO, ASSIGNOR TO THE OWENS BOTTLE COMPANY, OF TOLEDO, OHIO, A CORPORATION OF OHIO.

MEANS FOR FEEDING MOLTEN GLASS.

Application filed October 17, 1921. Serial No. 508,285.

*To all whom it may concern:*

Be it known that I, ENOCH T. FERNGREN, a citizen of the United States, residing at Toledo, in the county of Lucas and State of Ohio, have invented new and useful Improvements in Means for Feeding Molten Glass, of which the following is a specification.

My invention relates to apparatus for forming and delivering individual unit charges or gobs of glass from a supply of molten glass. The invention is herein shown as embodied in an apparatus comprising a discharge chamber to which the molten glass is continuously supplied from a melting tank. The glass is permitted to flow from an outlet orifice in the bottom of the discharge chamber. The issuing glass is suspended from the walls of the outlet and is periodically severed to form individual masses or gobs.

An object of the invention is to provide suitable means to periodically vary the depth or head of glass within the discharge chamber and thereby control the discharge. The glass is permitted to issue under a comparatively high head of glass within the discharge chamber to form a suspended gob. The head of glass is then reduced, thereby reducing the pressure acting to expel the glass, and the suspended gob is severed at a point a short distance below the outlet. When the head of glass is again increased after a suitable time interval, a comparatively rapid flow or extrusion is again established, owing to the increased expelling force due to said head. The depth or head of glass within the discharge chamber is controlled by means of a gate or valve which is periodically projected through the glass to restrict the downward movement of the glass in said chamber, said gate serving to support the glass above it and thus reduce the head or pressure acting to expel the glass therebeneath.

Other features of the invention will appear hereinafter.

In the accompanying drawings:

Figure 1 is a sectional side elevation of an apparatus constructed in accordance with my invention.

Figure 2 is a sectional plan, the section being taken at the line 2—2 on Figure 1.

Figure 3 is a fragmentary sectional elevation showing a modified form of discharge chamber.

Figure 4 is a front elevation of the apparatus.

Figure 5 is a side elevation.

Figure 6 is a plan view of the cutting apparatus.

Figure 7 shows a valve and its actuating cam for controlling the air motor.

Molten glass 10 is continuously supplied from a melting tank to a boot or extension 11, the outer end of which forms a discharge chamber 12 having an outlet opening 13 in the bottom thereof through which the glass issues. A block 14 projecting upward above the floor of the boot forms the inner wall of the discharge chamber and separates the main body of glass within the boot from that within the discharge chamber. The well or chamber 12 may be considerably narrower than the boot or channel in rear of the wall 14 so that said well is of comparatively small capacity. The flow of glass over the wall or dam 14 is restricted and controlled by a gate valve 15 which may be adjusted up and down by any suitable mechanism as, for example, the cable 9, screw rod 8 and hand wheel 7, to regulate the rate of flow. A block 16 behind the gate 15 extends downward into the boot and bridges the space between the vertical walls of the boot and forms a damper to control the passage of air or gases of combustion. The damper 16 is likewise adjustable up and down.

A controlling device 17, herein shown as a gate valve, projects through an opening 18 in the front wall of the boot, into the chamber 12 and is adapted to be periodically reciprocated in the direction of its length, that is, transversely of said chamber for regulating the head of glass above the outlet 13. The valve 17 is preferably inclined, as shown, and has secured thereto a head 19 slidably mounted on a frame 21. The valve is reciprocated by an air motor 22, the piston rod 23 of which is connected through a link 24 to a lever 25 fulcrumed on the frame 21, said lever at its opposite end being connected through a link to the head 19. The supply of air to the motor 22 is controlled by a reversing valve 26 (Fig. 7) of any usual or approved construction. As shown, the pressure pipe 27 is open through the valve 26 to the pipe 28 leading to one end of the piston motor. A pipe 29 extending from the other end of the motor is open through the valve to the atmosphere. By reversing the valve, the pipes 29 and 28 are respectively connected to the pressure pipe 27 and the atmosphere, thereby reversing the motor. The valve 26 is actuated by a cam 30 on a continuously rotating vertical drive shaft 32 and a compression spring 31 in the valve housing. A burner 33 may be provided at the forward end of the boot to maintain and control the temperature of the glass therein.

The cutting mechanism comprises a pair of shear blades 34 pivotally mounted at 35 on a supporting bracket 36. The shears may be actuated by any suitable cam 37 fixed to the drive shaft 32 and operating through a lever 38 having a fulcrum 39. The lever reciprocates a slide 41 which is connected through links 42 to the shear blades. The shears are operated once during each complete rotation of the drive shaft. The valve 17 is also reciprocated once during each rotation of the drive shaft. The operation of the shears and valve 17 are synchronized to operate in the timed relation required to produce the results hereinafter pointed out.

In operation, when the valve 17 is withdrawn a descending head of glass is provided, extending from the top of the wall 14 to the outlet orifice. This head has the advantage of having besides its weight, a falling or dropping motion as it approaches the outlet 13. Considerable pressure is, therefore, applied to the issuing glass which is, therefore, rapidly expelled and forms a gob 43 suspended from the walls of the orifice. When the valve 17 is projected inwardly, it restricts the downward flow of glass so that the head of glass above the orifice is greatly reduced. The shears now operate to sever the suspended gob, and the further flow of glass through the orifice is retarded or suspended until the valve 17 is withdrawn to again increase the head. The valve 17 is preferably arranged to restrict but not entirely cut off the flow of glass, as by leaving a restricted passageway between said valve and the wall 14, the pressure head of glass is more quickly established after the valve is withdrawn, than it would be if the flow were entirely cut off.

In the modification shown in Figure 3, the wall 14 is cut away at 15 so that a space is maintained between said wall and the descending glass. There may thus be provided an unconfined and freely descending column or stream between the valve 17 and the outlet which as a body is out of contact with the chamber walls. This facilitates the rapid establishing of a more dynamic pressure head of glass when the valve is withdrawn. As is indicated by the spacing and relation of parts in Figure 3, the pressure head of the glass, as it is released, will practically project itself through the orifice 13. The resultant descending formation or gob of glass that extrudes from the outlet will be of a larger and a more uniform cross section than the one shown in Figure 1. The severance of this kind of a gob by the shear blades 34 will produce, (particularly if the cut occurs as the extruded glass is being tensioned at the suspension point by the pull of its weight and inertia), a temporary suspension in extruding action from the outlet 13 as the pressure head is then at its lowest ebb, or emptied out so to speak, which enables the forces of resistance of the glass such as its viscosity, adhesiveness to walls of outlet, elasticity, et cetera, to react and establish in some instances, even a retractive action at the outlet.

Modifications may be resorted to within the spirit and scope of my invention.

What I claim is:

1. In apparatus for producing charges of molten glass, the combination of a well or chamber having an outlet opening in the bottom thereof, means to flow a continuous stream of glass into said well, and means operating within the well at a point between said outlet and the point at which the glass enters the well to periodically obstruct the flow to said outlet.

2. In apparatus for producing charges of molten glass, the combination of a discharge chamber or well having an outlet opening in the bottom thereof, means to admit a continuous supply of glass to the well at a point above said outlet, and an obstructing device periodically interposed between said point of supply and said outlet.

3. In apparatus for producing charges of molten glass, the combination of a discharge chamber or well having an outlet opening in the bottom thereof, means to admit a continuous supply of glass to the well at a point above said outlet, a valve, and means to periodically project it across the path of the glass between said outlet and said point of supply.

4. The method which consists in continuously supplying molten glass to a discharge chamber, permitting the glass to discharge from said chamber by gravity, and periodically introducing an obstruction between the outlet for said chamber and the upper surface of the glass therein and thereby reducing the pressure head.

5. The method which consists in causing a gravity flow of glass from an outlet in the bottom of a discharge chamber, continuously supplying a flow of glass into said chamber at the upper end thereof, and periodically projecting an obstruction into said chamber at an intermediate point into position to restrict but not entirely cut off the movement of the glass.

Signed at Toledo, in the county of Lucas and State of Ohio, this 13th day of October, 1921.

ENOCH T. FERNGREN.